United States Patent [19]

Ebrahimi

[11] 3,715,516

[45] Feb. 6, 1973

[54] LINE CIRCUIT FOR KEY TELEPHONE SYSTEM

[75] Inventor: Jalal Ebrahimi, Ottawa, Ontario, Canada

[73] Assignee: Northern Electric Company Limited, Quebec, Canada

[22] Filed: June 17, 1971

[21] Appl. No.: 154,004

[52] U.S. Cl. ................................179/18 FA, 179/99

[51] Int. Cl. ...............................................H04g 1/30

[58] Field of Search .............179/18 F, 18 FA, 42, 99

[56] References Cited

UNITED STATES PATENTS 3,604,857 9/1971 Opferman ..............................179/99

3,420,961 1/1969 Averill, Jr.........................179/18 FA

*Primary Examiner*—Thomas W. Brown

*Attorney*—John E. Mowle

[57] ABSTRACT

A line circuit for interfacing subscriber sets of a key telephone system with a telephone line terminating at its other end in a central office or a private branch exchange. The line circuit embodies a novel approach in this particular field, utilizing logic building blocks to condition two control means performing functions associated with such systems. The approach is well suited to MIS components and technologies.

2 Claims, 2 Drawing Figures

LINE CIRCUIT FOR KEY TELEPHONE SYSTEM

FIELD OF THE INVENTION

This invention relates to a key telephone system, (abbreviated KTS), and particularly to line circuits for controlling such a system in response to signals initiated both in subscriber sets of the system and in a central office (abbreviated CO), or in a private branch exchange (abbreviated PBX) as the case may be.

BACKGROUND OF THE INVENTION

In a key telephone system including a plurality of telephone lines connecting the system with either a CO or a PBX, and a plurality of subscriber sets, certain requirements have to be satisfied in order to guarantee a proper and efficient interface between each subscriber set and each telephone line, and vice versa. The functions dictated and set by existing telephone systems and standards are well known and include requirements such as:

1. Responding to incoming ringing by indicating which line is being rung,
2. Indicating a busy state of a busy line,
3. Holding a line upon initiation of such condition by any of the subscriber sets,
4. Timing-out of abandoned calls, etc.

In general those functions are carried out by making and breaking various connections in response to initiating signals either from the CO or PBX, or from the subscriber sets. For this purpose a number of control means are utilized, which may be conventional relays. The function of the line circuit, then, is to respond to, and process the initiating signals to condition these control means accordingly. The reliability and efficiency of a telephone key system is a direct result of the line circuit and its performance. Moreover, in view of the extensive use of such devices, cost is of prime importance.

An improvement in performance of the required functions, associated with a cost reduction per line circuit is, therefore, a considerable improvement in the telephone service.

An advantage of this invention is the novel approach to the realization of such devices. The realization is well suited to MIS (Metal-Insulator-Semiconductor) integration technologies, which enhance reliability and decrease cost.

DESCRIPTION OF THE PRIOR ART

Canadian Pat. No. 763,518 issued July 18, 1967 to Charles Ernest Morse et al., and titled "Line Circuit for Key Telephone System" discloses a device utilizing two bipolar transistors and 3 relays as basic circuit components. The device as disclosed therein, or variations thereof, are widely used in telephone systems. During its use several shortcomings have been observed, such as:

i. the use of large capacitors and especially electrolytic ones which are unreliable and expensive.

ii. short duration power failure or sudden drops in power cause false ring conditions.

No doubt since the conception of telephone key systems, time and effort have been expended to improve line circuits and rid them of their disadvantages. Before achieving the present invention, it was realized that improvements based on the conventional approach are bound to produce only marginal results, as such approach has been developed close to its limits, based on the limits of the technology utilized. The present invention is a departure from prior art in realizing the line circuit. It utilizes a logic building block, rather than a total circuit approach. The flexibility of such approach will become apparent when discussing the invention in detail.

SUMMARY OF THE INVENTION

According to the broad aspect of this invention, the incoming ringing signal on the telephone or subscriber line (usually applied via an intermediate transducer (usually a so-called "line relay") to a binary logic means. A ring discriminator at the input of the logic means, being responsive to and serves to discriminate the ringing signals, (which are often ringing bursts of 1 second duration spaced 3–4 seconds apart, and defined within limits as to frequency, 20 to 30 Hz, and magnitude, 95 to 105 VRMS), causes excitation of its output after a minimum specified duration of the ringing (e.g. after two ringing cycles). In this context "excitation" or "activation" means a state which is different from the quiescent state. In other words, the discriminator recognizes incoming ringing signals and ignores all others on the telephone line. The logic means is also responsive to a ground signal (i.e. potential) originating in at least one of the subscriber sets of the key telephone system. The grounding point in each subscriber set is routed through the hook-switch, then through a momentary interrupt hold switch, and finally through the appropriate line pick-up switch by means of a connecting wire (sometimes termed A-lead) to the input of the line circuit of the appropriate line. Responsive to the logic means are a first and a second control means. Each of these control means has a quiescent and an active state, thus providing four operating configurations. Such control means may be relays, or any such other means adapted to be conditioned by the logic means, and capable of performing diverse switching functions. The nature of the means themselves resides outside of the realm of this invention.

The line circuit, comprising the binary logic means, and the first and second control means, establishes the four basic conditions of a subscriber line in a key telephone system, namely, it conditions the two control means in one of four states each corresponding to one of the line conditions: idle, ringing, busy and holding.

The following illustrates the previous operating conditions of a preferred embodiment of the invention.

The Idle Condition

In the idle condition no signals are on the line, and all subscriber sets are in an on-hook condition. Both control means are in their quiescent state.

The Ringing Condition

The ringing condition is that of an incoming ring signal on the subscriber line (from the CO or PBX). After a specified number of ringing cycles, the ringing is recognized by the discriminator as such. Responding to the excitation of the discriminator therein, the logic means conditions the second control means into the active state.

The second control means being active, and the first quiescent, defines and corresponds to the state of incoming ringing on the line. Various functions are then performed by both control means in their new combined state, such as causing the associated line light in the subscriber sets to flash on and off, etc.

If the calling party abandons the call before it is answered, the incoming ringing ceases (from the CO or PBX). The discriminator returns to the quiescent state, which it also did during the ringing pauses. The output driving the second control means however, retains its excited state after the discriminator became quiescent, for a period of time which is longer than the longest time between any two ringing bursts.

The second control means, therefore, becomes quiescent after a delay period generally known as "-time-out" delay.

The Busy Condition

The busy condition is that when the line is picked up, which must include an off-hook condition. This condition is established when either:

a. answering an incoming call, or b. initiating a call.

a. Answering an incoming call (second control means is active prior to line pick-up):

The line pick-up causes the ground connection to the input of the logic means to be completed, which causes:

i. the first control means to activate; and ii. the second control means to become quiescent without delay.

The busy condition is established, and the control means make and break connections associated with such condition, e.g. the flashing line light changes to a steady light, etc. The ceasing of the incoming ringing signal on the line is caused at the CO or PBX.

b) Initiating a call (both control means are idle prior to line pick-up):

Again, the line pick-up causes the ground connection to the logic means to be completed thereby causing the first control means to activate. The second control means stays quiescent. This is the same condition as that under (a), as far as concerns the line circuit and the key telephone system.

The Holding Condition

The holding condition can be established only when the prior condition is the busy condition, i.e., when the first control means is active, and the second quiescent. In the subscriber set, an interruption of the ground connection to the logic means is the hold initiating signal.

Upon interruption of the ground connection, the first control means becomes quiescent for a very short time (approx. 10 milliseconds), the new condition (both control means are quiescent) is actually an idle condition, but is a necessary step before going into the hold condition, and is therefore termed here "temporary hold". During the "temporary hold", the subscriber set is still connected to the line, due to the deliberate slow release (approx. 60 milliseconds) of the hold initiating means in subscriber sets. The first control means, made to inhibit the activation of the line relay when activated, upon becoming quiescent permits the line relay to activate for a moment (reaction time of line relays is in the order of 1 millisecond), thereby exciting the logic means, followed by both the first and second control means, which activate substantially at the same time. With both the first and second control means active, the holding condition is established.

In the description of the preferred embodiment of this invention, variations of this basic concept for realizing the line circuit will be shown, that will permit a greater and more precise understanding of the working of the invention.

BRIEF DESCRIPTION OF THE DRAWINGS

An example embodiment of the invention will now be described with reference to the accompanying drawings in which.

DESCRIPTION OF THE PREFERRED EMBODIMENT

Figure 1:
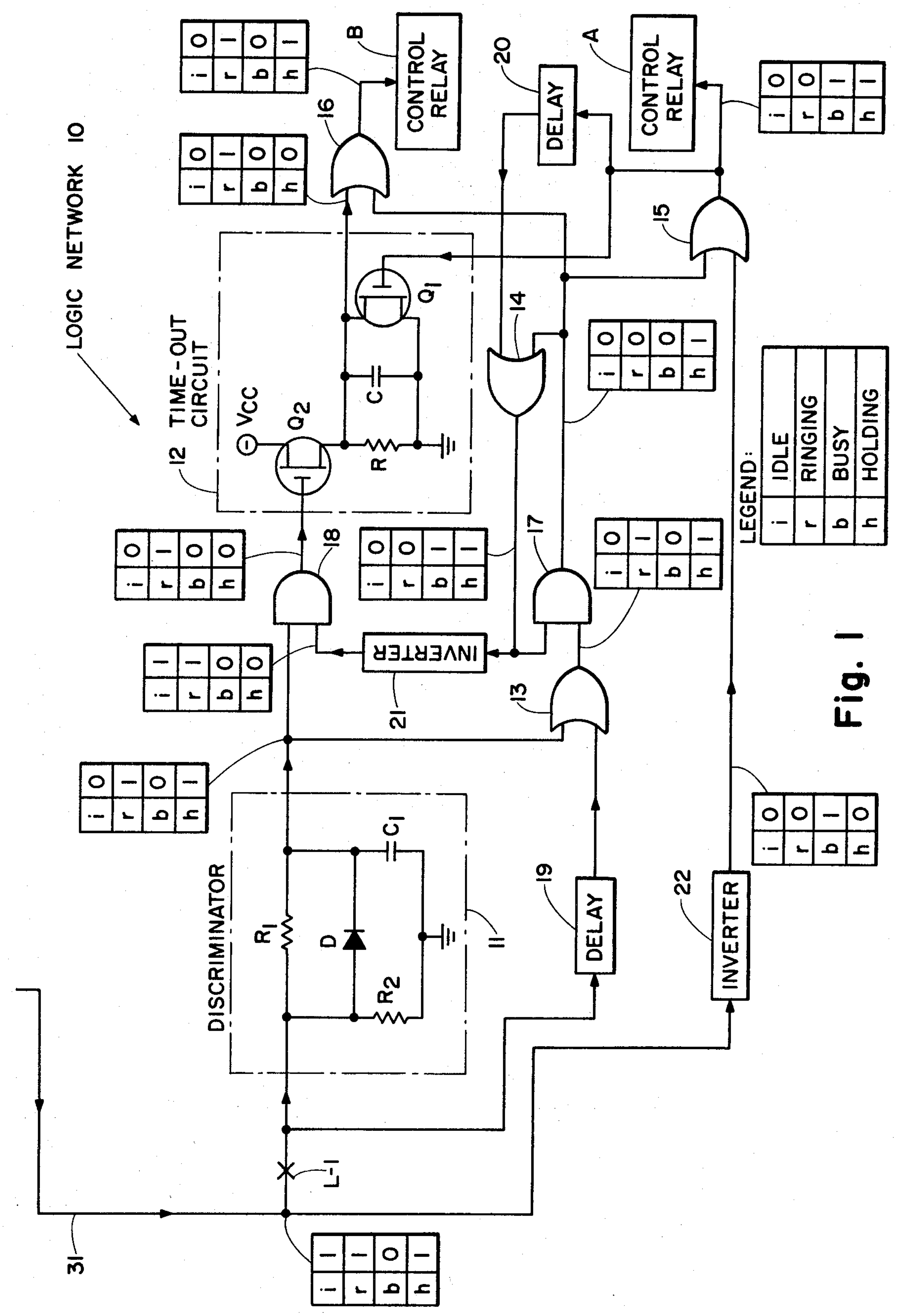
FIG. 1 is a block and schematic circuit diagram of a line circuit according to this invention.
Figure 2:
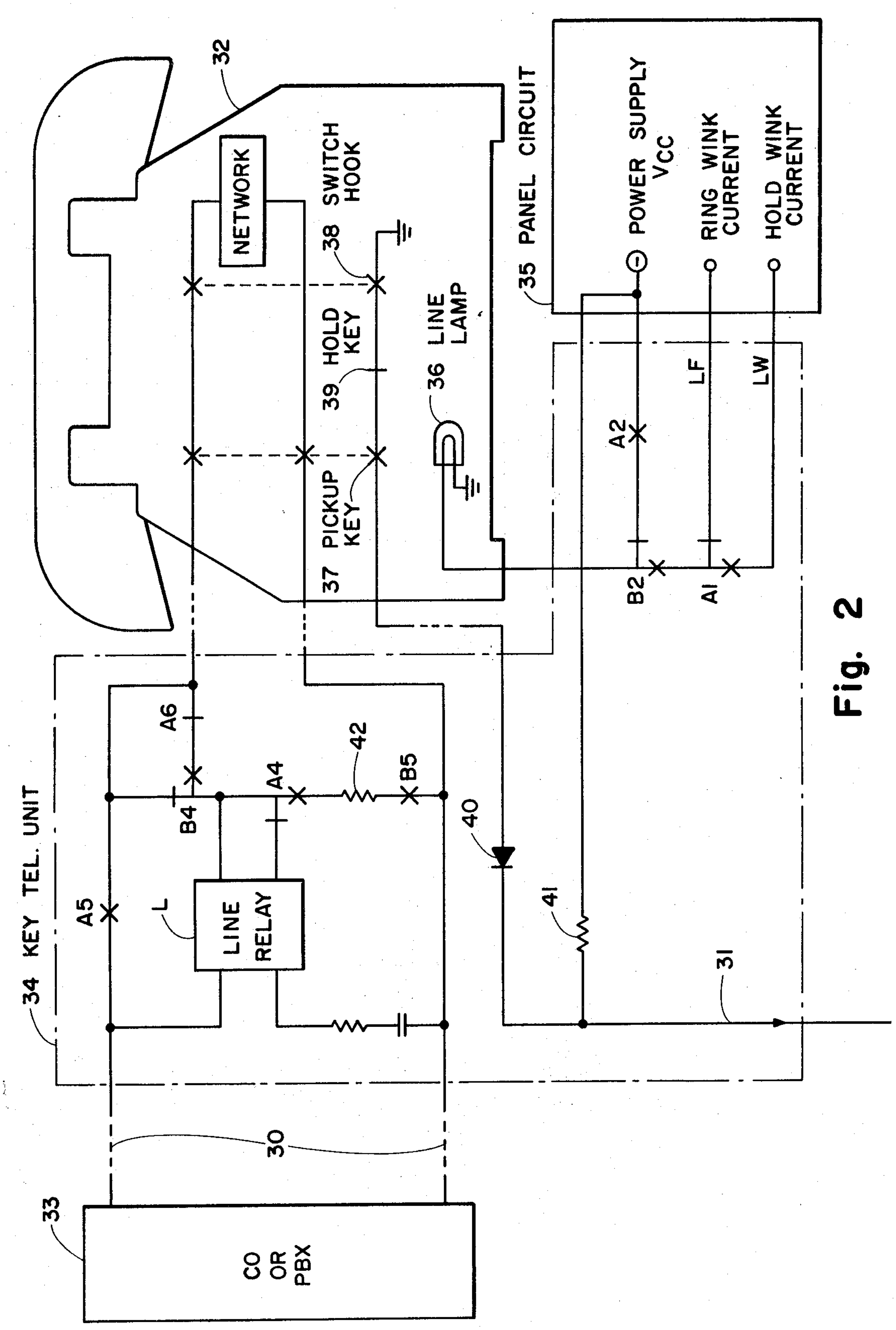
FIG. 2 is a circuit schematic showing typical key telephone system interconnections associated with the line circuit illustrated in FIG. 1.

With reference to FIGS. 1 and 2, the line circuit comprises a first and a second control relay A and B, both responsive to a binary logic network generally 10; the logic network 10 being responsive to a subscriber line 30 via a make contact L–1 of a line relay L and to a signal on connection 31 initiated in a subscriber set 32 of a key telephone system. It is to be noted that connection 31 is common to both Figures.

The logic network 10 comprises a ringing discriminator 11, a multiple-function time-out circuit 12, and a plurality of binary OR logic gates 13, 14, 15 and 16, and binary AND logic gates 17 and 18, interconnected to coordinate the ringing discriminator 11 and the multiple-function time-out circuit 12, thereby controlling the operation of the first and second control relays A and B.

In the line circuit the input connection 31 is connected to one side of the make contact L–1, the other side of which is connected to the input of the ringing discriminator 11 and to a delay network 19. The output of the delay network 19 is connected to a first input, and the output of the ringing discriminator 11 is connected to a second input of the OR gate 13. The output of the OR gate 13 is connected to a first input of the AND gate 17. The output of the AND gate 17 is connected to first inputs of the three OR gates 14, 15 and 16. The output of the OR gate 15 is connected to a delay network 20, while the output of the delay network 20 is connected to a second input of the OR gate 14. The output of the OR gate 14 is connected to a second input of the AND gate 17, and to inverter 21. The output of the inverter 21 is in turn connected to a second input of the AND gate 18, while the output of the AND gate 18 is connected to a first input of the multiple-function time-out circuit 12. The output of the OR gate 15 is connected to a second input of the time-out circuit 12 while the output of the time-out circuit 12 is connected to a second input of the OR gate 16. The input connection 31 is also connected to an inverter 22, the output of which is connected to a second input of the OR gate 15. The output of the OR gate 15 controls control relay A, and the output of the OR gate 16 controls control relay B.

The ring discriminator 11 comprises a resistor $R_1$ connected in parallel with a diode D between the input and output, a resistor $R_2$ connected between the input and ground, and a capacitor $C_1$ connected between the output and ground.

The multiple-function time-out circuit 12 comprises a resistor R connected in parallel with a capacitor C and in parallel with the source-drain channel of an MIS transistor $Q_1$, the gate of which is a no-delay input of the time-out circuit 12. One terminal of the parallel connection is grounded and the other terminal is connected to one side of the channel of another MIS transistor $Q_2$. The other side of the channel of $Q_2$ is connected to a common power supply voltage Vcc. The gate of the transistor $Q_2$ is the input of the time-out circuit 12. The common connection point of the four components R, C, $Q_1$ and $Q_2$ is the output of the time-out circuit 12. The MIS transistors $Q_1$ and $Q_2$ are P-channel enhancement-mode devices.

The discriminator 11, being the ringing recognition device, has to have component values such that the charging time-constant $R_1C_1$ be larger than half the period of the ringing signal, which is converted to unipolar pulses by the action of the contact L–1. The resistor $R_1$ can be quite large to achieve the required time-constant. The discharge time constant given by $R_2C_1$ mainly determines the number of ringing pulses to pass (usually six, or three ring cycles) before the ringing signal is recognized as such. If it is too short, the ringing would not be recognized at all, and if it is too long, a ringing condition would be indicated within the first cycle; this would lead to false ringing indication due to spurious or dial pulses on the telephone line 30.

In the time-out circuit 12, the delay time which is approximately the discharge time-constant of the parallel connection of the resistor R and the capacitor C, can be made sufficiently large by using a large value of the resistor R. This discharge time-constant RC must be larger than the longest pause between the ringing bursts of a ringing signal, which is usually in the order of 3 to 4 seconds. However, if the transistor $Q_1$ is switched on via the no-delay input, then the discharge occurs through the transistor $Q_1$ and the discharge time-constant is negligibly short. Similarly the charge time-constant which occurs through the transistor $Q_2$ when switched on, is also negligibly short. Both are much less than one millisecond.

The working of the line circuit will be described in connection with other components of a key telephone system, which comprises the telephone line 30 connecting a CO or PBX 33 with a key telephone unit 34, and a subscriber set 32 and a panel circuit 35. The key telephone unit 34 contains the line relay L and other known components such as a holding bridge, which is a resistor 42. Usually there is a receptacle provided for the line circuit to plug-in, so that it can be easily removed for maintenance purposes. A diode 40 is provided to minimize the effects of eventual stray voltages induced in the wires connecting the subscriber set 32 with the key telephone unit 34. A resistor 41 limits the current flow through the diode 40 when its anode is at ground.

The subscriber set 32 has a switch hook 38, a switch to pick-up the appropriate line termed pick-up key 37, and a momentary interrupt switch termed holding key 39 to initiate the holding condition. It also includes a line lamp 36 to illuminate the pick-up key 37 when the line 30 is other than in the idle condition.

The panel 35 provides the supply voltage Vcc with respect to ground, Vcc being negative in the case of the preferred embodiment. It also provides other accessory functions such as interrupted current for the line lamp 36 at two different "wink rates", one to indicate the ringing condition, and the other to indicate the holding condition. If local ringing is required, the panel circuit 35 also provides the current therefore. The functions indicated in FIG. 2 are only exemplary.

In the drawings, the symbol—✕—denotes a make-contact, and the symbol—|—denotes a break-contact. Some contacts are designated either "A" or "B", followed by a one digit number, the designation identifies the contact as either belonging to the first control relay A, or to the second control relay B, the number identifies various contacts of the appropriate control relay. The make-contact L–1 is a contact of the line relay L.

In describing the operation of the line circuit two states for the inputs and outputs of each of the building blocks are defined:

an excited state denoted by the logical "1" and termed "high", corresponding to a potential substantially equal to *Vcc*; and a quiescent state denoted by the logical "0" and termed "low", corresponding to a potential substantially equal zero, or ground potential.

For the first and second control relays A and B, a logical "1" means "relay operating", and a logical "0" means "relay quiescent".

The four conditions of a subscriber line 30 in terms of the combined states of the first and second control relays A and B respectively, are defined in the following logical "truth table":

| Line Condition | First Control Relay "A" | Second Control Relay "B" |
|---|---|---|
| Idle | 0 | 0 |
| Ringing | 0 | 1 |
| Busy | 1 | 0 |
| Holding | 1 | 1 |

The following is the detailed description of the internal state of the line circuit during the four conditions of the subscriber line 30: idle, ringing, busy and holding.

Line Idle

With no signal on the subscriber line 30, the line relay L is quiescent and the contact L–1 is open. The input connection 31 is high, having a potential substantially equal Vcc. Inverter 22 is low at its output. The contact L–1 being open, the discriminator 11 and delay 19 are low at their input and output. The OR gate 13 is also low and, therefore, the AND gates 17 and 18 are also low, as well as the time-out circuit 12. The OR gates 15 and 16 are low, and as a result, the first and second control relays A and B are quiescent. During this condition, the line lamp 36 is not illuminated.

This, as defined in the "truth table" supra, corresponds to the idle condition of the subscriber line 30.

Line Ringing

The line relay L, activated by each half cycle of the first burst of the incoming ringing signal, causes the make contact L–1 to close and open at a rate twice the ringing frequency, thereby producing at the inputs of the discriminator 11 and the delay 19 a unipolar pulse train, one pulse for each half ringing cycle. The amplitude of those unipolar pulses is substantially equal *Vcc*. The pulses are input to the discriminator 11, the output of which goes high after approximately six pulses. The AND gate 18 then goes high, because the output of inverter 21 is high, and consequently the output of the time-out circuit 12, followed by the OR gate 16 both go high. This in turn operates the second control relay B. The first control relay A stays quiescent.

The new state of the first and second control relays A and B causes connections associated with the ringing condition to be completed. For example, the ring wink current generated in the panel circuit 35 and connected to lead LF is applied through break-contact A1 and make-contact B2 in the key telephone unit 34 to the line lamp 36 in the subscriber set 32. The line lamp 36, therefore, starts flashing at a certain wink rate, indicating the ringing condition of the line 30.

After the first ringing burst has ceased, the discriminator 11 goes low after a negligible delay. As a result, the AND gate 18 goes low also. The time-out circuit 12, however, stays high for a time longer than the longest pause between the ringing bursts, because of the discharge time-constant RC. The second control relay B, therefore, stays operating during the ringing pauses and maintains the ringing condition.

If the ringing ceases before the line 30 is picked up, the second control relay B releases after the delay time given by RC, which is termed time-out period, and the line circuit goes back into the idle state.

If, on the other hand, the line 30 is picked up, the busy condition is established.

Line Busy:

The line 30 is connected by closing a pick-up key switch 37 and the switch-hook switch 38 in the subscriber set 32, thereby grounding the anode of diode 40, and causing substantially ground potential to appear at its cathode, or at the connection 31. The output of the inverter 22 goes high, followed by the OR gate 15, and finally by the first control relay A, which operates.

Following the OR gate 15, the no-delay input of the time-out circuit 12 goes high, and its output, therefore, immediately goes low, followed by the OR gate 16, and finally by the second control relay B, which releases.

The first control relay A is now operating and the second control relay B is quiescent. This corresponds to the busy condition.

If the switch hook 38 is actuated to initiate a call, rather than to answer a call, the first control relay A operates as described above, while the second control relay B stays quiescent. As a result, the line lamp 36 is connected via make-contact A2 to Vcc and steadily illuminated.

From the busy state, the line 30 can be "held" for an indefinite period of time until the calling party abandons the call, or until the busy state is resumed again.

Line in Hold:

By interrupting the hold key switch 39 in the subscriber set 32, a transfer from the busy condition into the hold condition can be established. Upon such momentary interruption, the ground potential on the connection 31 to the line circuit is interrupted, and the output of the inverter 22 goes low. The contact L–1, which was open during the busy condition (because contacts "A5" and "B4" in FIG. 2 inhibit the activation of the line relay L in such condition), leaving the inputs of the discriminator 11 and the delay 19 at substantially zero potential or low, caused the output of the AND gate 17 to be low. Therefore, the output of the OR gate 15 goes low, causing the control relay A to release. Immediately the control relay A is quiescent, contact "A5" opens and the line relay L activates (reaction time in the order of 1 millisecond). The foregoing action has occurred within a few milliseconds, before the pick-up key switch 37 and its associated contacts has released, which takes at least some 60 ms from the moment of activating the hold key switch 39. So that the line relay L was able to operate. As line relay L operates, the contact L-1 closes, applying a potential Vcc to the input of the delay 19, the output of which goes high after a delay of approximately 10 milliseconds, followed by the output of the OR gate 13.

Although the OR gate 15 output has gone low immediately the hold key switch 39 was interrupted, the output of the delay 30 stays high for say 40 ms, so that the output of the OR gate 14 is also high during that period. And since the output of the OR gate 13 has gone high after only 10 ms from the hold initiation, the output of the AND gate 17 goes high, maintaining one input of the OR gate 14 high, and therefore its output. The AND gate 17 causes both the OR gate 15 and the OR gate 16 to go high substantially at the same time, thereby causing the first and second control relays A and B, respectively, to operate, thus establishing the holding condition. If, due to a difference in reaction times, the control relay A operates before the control relay B, which could cause the line relay L to release, the delay 19 still holds its output high for a time longer than any difference in reaction times, thereby maintaining the hold action, and permitting the control relay B to continue its action and operate. The hold condition is therefore completed, regardless of any difference in the reaction times of the control relays A and B, as long as the delay 19 is longer than such difference, which is a maximum tolerance depending on the type of relays used, and is usually no more than 10 milliseconds. The activation of the control relays A and B, for example, causes the line lamp 36 to change from steady to interrupted illumination at the hold wink rate by connecting it to the hold wink terminal in the panel circuit 35 via make-contacts A1 and B2. And most important, this also causes the connection of the "holding bridge", i.e. the resistor 42 (FIG. 2) to the line relay L via contacts A4 and B5, which maintains the line 30 busy (with respect to the CO or PBX 33 not to the key telephone system), and the line relay L operating via its alternative winding, through its terminal connected to break-contact A4. The contact L–1, therefore, stays closed during the hold.

When the line is picked up again and ground potential appears on the input connection 31 to the line circuit, the delay 19 as well as the discriminator 11 go low, and consequently the AND gate 17 goes low. The output of the OR gate 16 goes also low, since the output of the time-out circuit 12 is, and was, low. The second control relay B, therefore, releases. The first control relay A, however, maintains its active state, via the inverter 22, which maintains the OR gate 15 high. This again is the busy condition.

If the call is abandoned during the hold from the CO or PBX 33, the line relay L releases and the contact L–1 opens, which causes the output of the AND gate 17 to go low (after some delay given by the delay 19). Thus, the first and second control relays A and B, respectively, release. The first control relay A does not stay active here, because the input connection 31 to the inverter 22 is high, and its output, therefore, low.

FURTHER DESCRIPTION

The incorporation of the inverters 21 and 22 as separate entities was done merely to warrant clarity and avoid ambiguity in describing the preferred embodiments. Often, binary logic gates are available with inverting and noninverting inputs, the inverters being integral with the gates.

The delays 19 and 20 are logic delays, delaying the transition from a logical "1" to a logical "0" and vice versa, at their inputs. Their realization is particularly simple in MIS technologies, given the very high input resistances of MIS-transistors, long time delays can be achieved with capacitors in the order of one nanofarad, by increasing the associated resistor codetermining the time-constant.

The preferred embodiment described above is flexible in that the building blocks can be rearranged to yield line circuits suited to various telephone systems and standards. The following example will illustrate this.

The delay 19, and the OR gate 13 may be omitted altogether and the output of the discriminator 11 applied directly to the AND gate 17. In that case, the delay given by the discriminator 11 replaces that which was provided by the delay 19. This is feasible, where the detailed specifications of the given telephone system require or permit the same delay for the delay 19 and the discriminator 11. The delay 19, as explained before permits the second control relay B to complete its operation if the first control relay A operates first during completion of a transfer from the busy to the hold condition.

Another alternative leading to the same result, is to remove the delay 19 and the OR gate 13 as described above, but install the delay 19 only, between the OR gate 16 and the second control relay B. This would also permit the second control relay B to complete its operation, although the first control relay A might have reacted faster in the process of transferring to the hold condition.

What is claimed is:

1. A line circuit for controlling the connection of a subscriber set in a key telephone system to a telephone line, comprising:

first and second control means each having first and second operating positions to provide four operating configurations; and a binary logic means responsive to an idle condition of said telephone line and said subscriber set for conditioning said first and second control means in a first operating configuration to indicate said idle condition;

said binary logic means also being responsive to an incoming ringing signal, containing a succession of ringing bursts and ringing pauses, on said telephone line for conditioning said first and second control means in a second operating configuration to indicate an incoming ringing signal condition;

said binary logic means including a discriminator network for delayedly responding to said incoming ringing signals, and a multi-function time-out circuit for maintaining said ringing condition during said ringing pauses;

said binary logic means also being responsive to an off-hook condition of said subscriber set for conditioning said first and second control means in a third operating configuration to indicate a busy condition of said telephone line; and said binary logic means also being responsive to initiation of a hold signal from said subscriber set to condition said first and second control means in a fourth operating configuration to indicate a hold condition of said telephone line.

2. A line circuit for controlling the connection of a subscriber set in a key telephone system to a telephone line, comprising:

a first and a second control means each having first and second operating positions to provide four operating configurations;

a ringing discriminator delayedly responsive to incoming signals on said telephone line and also to an initiating signal from said subscriber set, to provide an output signal during either a ringing condition or a hold condition of the system;

a first OR gate responsive to said incoming signals on said telephone line, to said initiating signal from said subscriber set, or to the output signal from said ringing discriminator, to provide an output signal during either said ringing or said hold conditions;

a first AND gate responsive to the output signal from said ringing discriminator and to an output signal from a second OR gate, to provide an output signal during said ringing condition;

a second AND gate responsive to the output signals from the first and second OR gates, to provide an output signal during said hold condition;

a third OR gate responsive to said initiating signal from said subscriber set or to the output signal from said second AND gate, to provide an output signal during either a busy condition or said hold condition of the system;

said second OR gate being responsive to the output signals from the second AND gate or the third OR gate, to provide an output signal during either said busy or said hold conditions;

a multi-function time-out circuit responsive to output signals from the first AND gate and the third OR gate, to provide an output signal during the ringing condition of the system so as to time-out abandoned incoming calls and sustain a continuous ringing condition during pauses between bursts of the ringing portion of said incoming signals;

a fourth OR gate responsive to the output signal from said time-out circuit or from said second AND gate, to provide an output signal during either said ringing or said hold conditions of the system; and said first control means being responsive to the output signal from said third OR gate and said second control means being responsive to the output signal from said fourth OR gate.

* * * * *